US011992050B2

(12) United States Patent
Liu

(10) Patent No.: US 11,992,050 B2
(45) **Date of Patent: *May 28, 2024**

(54) ELECTRONIC CIGARETTE

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 551 days.

This patent is subject to a terminal disclaimer.

(21) Appl. No.: 17/165,862

(22) Filed: Feb. 2, 2021

(65) Prior Publication Data

US 2022/0061385 A1 Mar. 3, 2022

(30) Foreign Application Priority Data

Aug. 25, 2020 (CN) ......................... 202010866623.2
Aug. 25, 2020 (CN) ......................... 202021803903.0
Sep. 27, 2020 (CN) ......................... 202011035852.6
Sep. 27, 2020 (CN) ......................... 202022155718.1

(51) Int. Cl.

| | |
|---|---|
| ***A24F 40/44*** | (2020.01) |
| ***A24F 7/00*** | (2006.01) |
| ***A24F 40/10*** | (2020.01) |
| ***A24F 40/42*** | (2020.01) |
| ***A24F 40/46*** | (2020.01) |
| ***A24F 40/48*** | (2020.01) |
| ***A24F 40/57*** | (2020.01) |

(Continued)

(52) U.S. Cl.

CPC ................ *A24F 40/44* (2020.01); *A24F 7/00* (2013.01); *A24F 40/10* (2020.01); *A24F 40/42* (2020.01); *A24F 40/46* (2020.01); *A24F 40/48* (2020.01); *A24F 40/57* (2020.01); *A24F 40/60* (2020.01); *H05B 6/804* (2013.01)

(58) Field of Classification Search

CPC .......... A24F 40/10; A24F 40/42; A24F 40/44; A24F 40/46; A24F 40/48; A24F 40/57

See application file for complete search history.

(56) References Cited

U.S. PATENT DOCUMENTS

2017/0164655 A1* 6/2017 Chen ..................... A24F 47/008
2017/0273359 A1* 9/2017 Liu ....................... A24F 47/008
2018/0020728 A1* 1/2018 Alarcon et al. ....... A24F 47/008

FOREIGN PATENT DOCUMENTS

CN 110279152 A * 9/2019 ........... A24F 47/008
WO WO 2020/015223 A1 * 1/2020 ........... A24F 47/008

OTHER PUBLICATIONS

CN 110279152 A—Machine Translation (Year: 2019).*
WO 2020015223 A1—Machine Translation (Year: 2020).*

* cited by examiner

*Primary Examiner* — Christopher M Rodd
*Assistant Examiner* — Ronnie Kirby Jordan
(74) *Attorney, Agent, or Firm* — MATTHIAS SCHOLL P.C.; Matthias Scholl

(57) ABSTRACT

An electronic cigarette includes a main body and a microwave heating module disposed in the main body. The microwave heating module includes a shielding sleeve, a strip of cotton, and a microwave source. The strip of cotton is disposed in the shielding sleeve. The shielding sleeve is disposed above the microwave source. In a power-on state, the microwave source emits microwave. The microwave is released into the shielding sleeve to heat and atomize e-liquid adsorbed on the strip of cotton to produce vapor for user's inhaling.

7 Claims, 5 Drawing Sheets

(51) Int. Cl.
*A24F 40/60* (2020.01)
*H05B 6/80* (2006.01)

| Technical parameters table of microwave heating | | | |
|---|---|---|---|
| ID | Name | Specifications | Note |
| 1 | Rated power | 2.0～260W | |
| 2 | Voltage | 3.7～14.8V | AC&DC |
| 3 | Heating temperature | 100～350°C | |
| 4 | Microwave frequency | 2400～2500 MHz | |
| 5 | Cell number | 1～4PCS | Lithium cell |
| 6 | Cell capacity | 2200 mA.h | Single cell capacity |
| 7 | Cell model | 18650 | Lithium cell |

FIG. 5

ELECTRONIC CIGARETTE

CROSS-REFERENCE TO RELAYED APPLICATIONS

Pursuant to 35 U.S.C. § 119 and the Paris Convention Treaty, this application claims foreign priority to Chinese Patent Application No. 202010866623.2 filed on Aug. 25, 2020, to Chinese Patent Application No. 202021803903.0 filed on Aug. 25, 2020, to Chinese Patent Application No. 202011035852.6 filed on Sep. 27, 2020, and to Chinese Patent Application No. 202022155718.1 filed on Sep. 27, 2020. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to an electronic cigarette.

Conventional electronic cigarettes include a heating wire to heat and atomize the e-liquid. In general, the heating wire is directly immersed into the e-liquid. The direct contact of the heating wire and the e-liquid may degrade the quality of the e-liquid.

SUMMARY

The disclosure provides an electronic cigarette, comprising a main body and a microwave heating module disposed in the main body; the microwave heating module comprises a shielding sleeve, a strip of cotton, and a microwave source; the strip of cotton is disposed in the shielding sleeve; the shielding sleeve is disposed above the microwave source; in a power-on state, the microwave source emits microwave; the microwave is released into the shielding sleeve to heat and atomize e-liquid adsorbed on the strip of cotton.

In a class of this embodiment, the microwave heating module comprises a first shielding net and a second shielding net; the first shielding net and the second shielding net are disposed on two ends of the strip of cotton in the shielding sleeve so as to hold the microwave emitted by the microwave source in the shielding sleeve, thereby increasing the microwave energy acting on the e-liquid and improving the heating efficiency.

In a class of this embodiment, the shielding sleeve comprises an e-liquid inlet.

In a class of this embodiment, the microwave heating module comprises a control panel and a battery; the battery is soldered on an input end of the control panel; an output end of the control panel is soldered to an input end of the microwave source for inputting alternating current to the microwave source to generate microwave.

In a class of this embodiment, the microwave heating module further comprises a cylinder and a silicone sleeve; the silicone sleeve is disposed around the microwave source; the silicone sleeve and the microwave source are disposed on an upper part of the cylinder; the control panel is fixed on a lower part of the cylinder; and the shielding sleeve is in threaded connection to the cylinder.

In a class of this embodiment, the main body comprises a housing; the microwave heating module is disposed on the housing; the battery and the lower part of the cylinder are disposed in the housing, and the upper part of the cylinder is exposed out of the housing.

In a class of this embodiment, the main body further comprises a button disposed on the control panel and exposed out of a side wall of the housing; and the button is configured to switch on a power source.

In a class of this embodiment, the electronic cigarette further comprises a mouthpiece and a glass tube; the bottom opening of the glass tube is disposed around the top part of the cylinder for e-liquid storage; the shielding sleeve is disposed in the glass tube; the mouthpiece is disposed in the top opening of the glass tube for sealing the top opening; the cylinder comprises at least one air vent; when in use, air enters the shielding sleeve via the at least one air vent of the cylinder and drives vapor resulting from the atomization of the e-liquid on the strip of cotton by the microwave to flow from the first shielding net to the mouthpiece for user's inhaling.

BRIEF DESCRIPTION OF THE DRAWINGS

FIG. 5 shows electrical parameters of an electronic cigarette in accordance with one embodiment of the disclosure.

DETAILED DESCRIPTION

To further illustrate, embodiments detailing an electronic cigarette are described below. It should be noted that the following embodiments are intended to describe and not to limit the disclosure.

Tobacco materials refer to tobacco tar, tobacco paste, tobacco leaf and other materials used to produce smoke.

Principle of microwave heating: microwave heating is a multiphysics phenomenon that involves electromagnetic waves and heat transfer; any material that is exposed to electromagnetic radiation will be heated up owing to the collision between the material molecules. The rapidly varying electric and magnetic fields lead to sources of heating.

Figure 1:
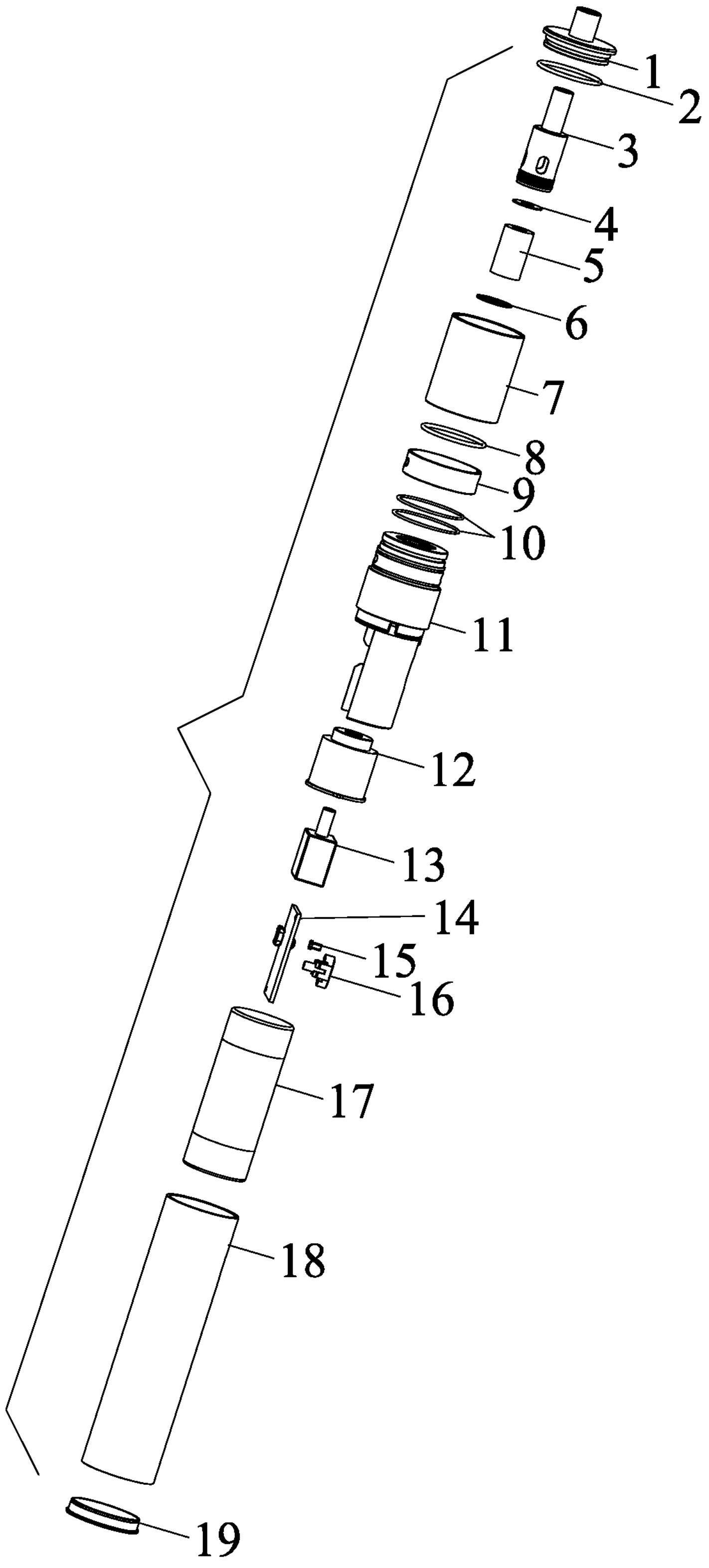
FIG. 1 is an exploded view of an electronic cigarette in accordance with one embodiment of the disclosure.
Figure 2:
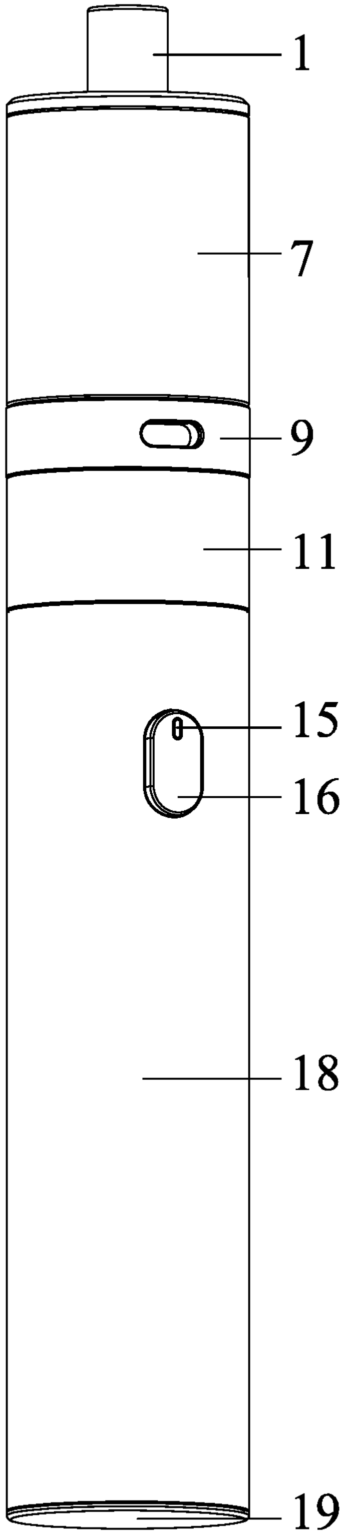
FIG. 2 is a schematic diagram of an electronic cigarette in accordance with one embodiment of the disclosure.
Figure 3:
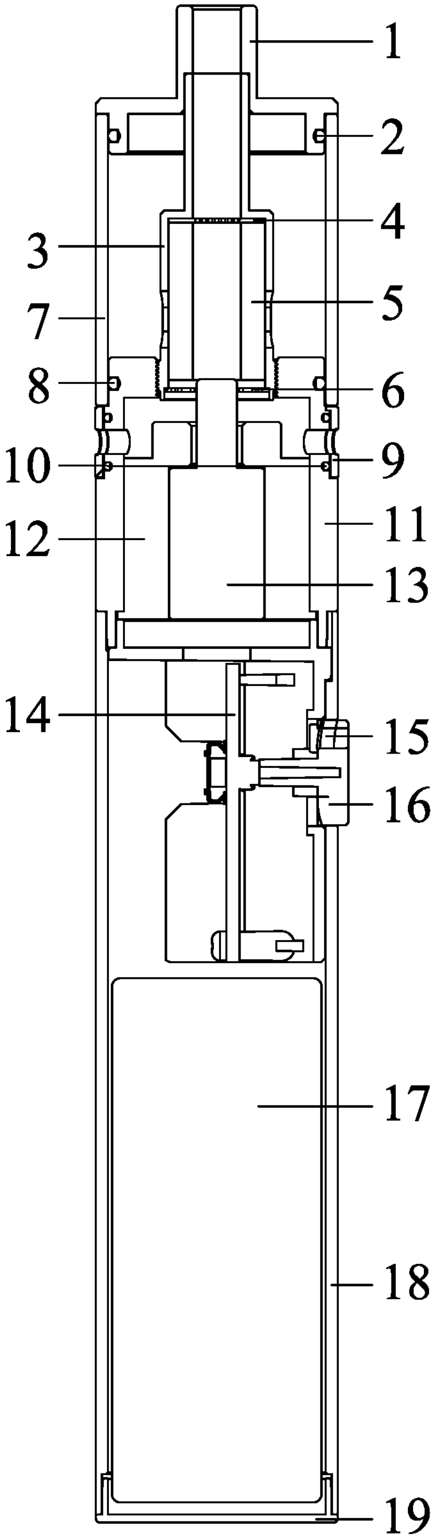
FIG. 3 is a sectional view of an electronic cigarette in accordance with one embodiment of the disclosure.
Figure 4:
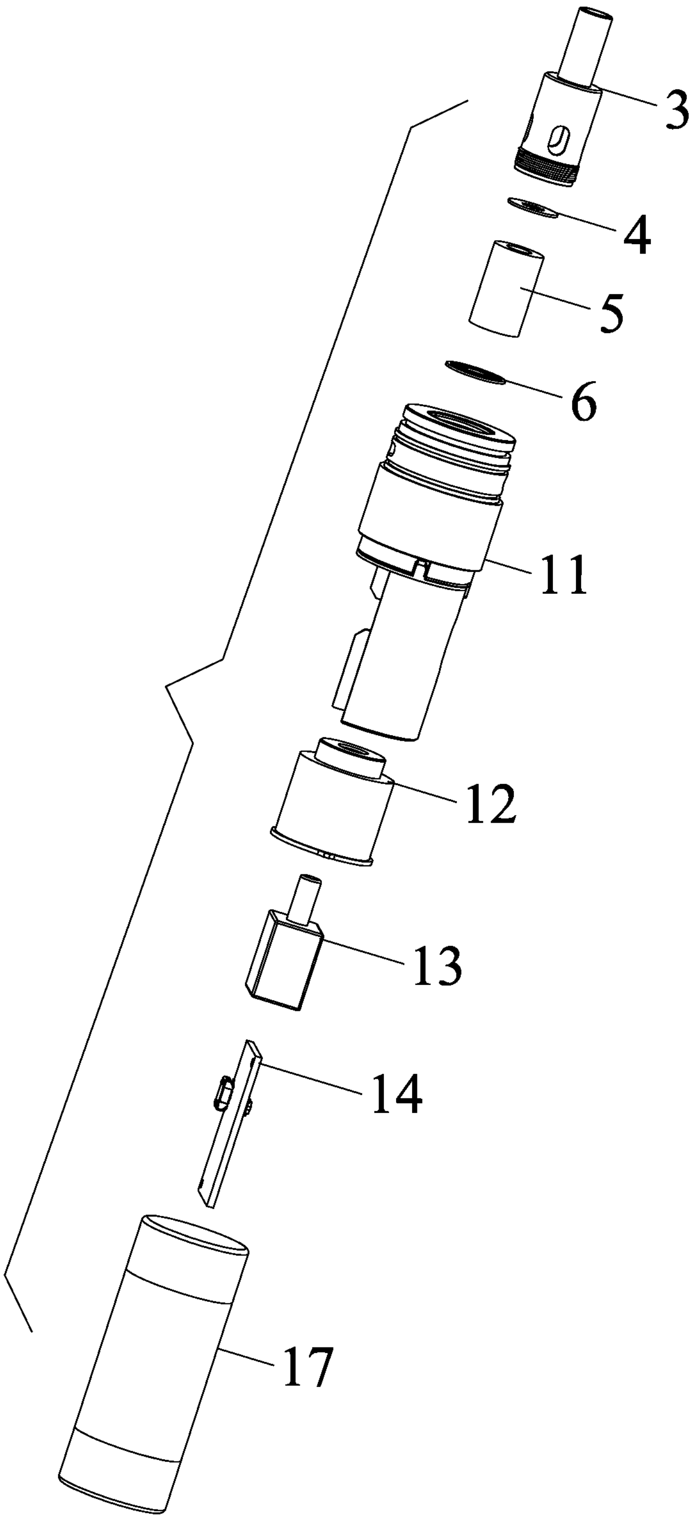
FIG. 4 is a schematic diagram of a microwave heating module of an electronic cigarette in accordance with one embodiment of the disclosure.

As shown in FIGS. 1-5, the disclosure provides an electronic cigarette comprises a mouthpiece 1, a first seal ring 2 sealing the mouthpiece, a shielding sleeve 3, a first shielding net 4, a strip of cotton 5, a second shielding net 6, a glass tube 7, a second seal ring 8 sealing the glass tube, an airflow regulation ring 9, a third seal ring 10 sealing the airflow regulation ring, a cylinder 11, a silicone sleeve 12, a microwave source 13, a control panel 14, a light guide 15, a button 16, a battery 17, a housing 18, and an end cover 19. The shielding sleeve 3 comprises an e-liquid inlet. The strip of cotton 5 is disposed in the shielding sleeve 3. The first shielding net 4 and the second shielding net 6 are disposed on two ends of the strip of cotton 5 in the shielding sleeve 3 so as to hold the microwave released by the microwave source 13 in the shielding sleeve 3, thereby increasing the microwave energy acting on the e-liquid and improving the heating efficiency. The shielding sleeve 3 is in threaded connection to the cylinder 11. The silicone sleeve 12 is disposed around the microwave source 13. The silicone sleeve 12 and the microwave source 13 are disposed on the upper part of the cylinder 11. The shielding sleeve 3 is disposed above the microwave source 13. The output end of the control panel 14 is soldered to the input end of the microwave source 13 for inputting alternating current to the microwave source 13 to generate microwave. The control panel 14 is fixed on the lower part of the cylinder 11. The battery 17 is soldered on the input end of the control panel 14. The light guide 15 is disposed in the button 16 and is lighted up when the power is on. The button 16 is disposed on the switch contact of the body of the control panel 14 to switch on the power and trigger the electronic cigarette to work. The battery 17 and the lower part of the cylinder 11 are disposed in the housing 18, and the upper part of the cylinder is exposed out of the housing 18. The button 16 is exposed out of the side wall of the housing 18. The third seal ring 10 is disposed on the upper part of the cylinder 11 to fill the space between the airflow regulation ring 9 and the cylinder 11 thus preventing air leakage. The airflow regulation ring 9 is disposed on the upper part of the cylinder 11 to adjust the air volume. The cylinder 11 comprises at least one air vent. The bottom opening of the glass tube 7 is disposed around the top part of the cylinder 11 for e-liquid storage. The shielding sleeve 3 is disposed in the glass tube 7 so that the e-liquid enters the strip of cotton 5 from the e-liquid inlet of the shielding sleeve 3. The second seal ring 8 is disposed between the bottom opening of the glass tube 7 and the top part of the cylinder 11 to seal the bottom opening of the glass tube 7. The first seal ring 2 is disposed on the mouthpiece 1 to seal the space between the mouthpiece 1 and the top opening of the glass tube 7. The mouthpiece 1 is disposed in the top opening of the glass tube 7. The end cover 19 is fixed on the bottom end of the housing 18.

In certain embodiments, the battery 17 comprises 1-4 18650-type lithium cells, and each cell is 2200 mA·h. The output power range of the microwave source is 2.0-260 W, the voltage range is AC: 3.7-14.8V, the temperature range is 100-350° C., and the microwave frequency is 2400-2500 Mhz.

The following advantages are associated with the electronic cigarette of the disclosure:

1. The electronic cigarette uses microwave to heat and atomize e-liquid instead of conventional heating wires, which is novel.

2. The first shielding net and the second shielding net are disposed on two ends of the strip of cotton in the shielding sleeve so as to hold the microwave emitted by the microwave source in the shielding sleeve, thereby increasing the microwave energy acting on the e-liquid and improving the heating efficiency.

3. The e-liquid is stored in the glass tube and the heat source is microwave, which is environmentally friendly and will not damage the quality of the e-liquid.

It will be obvious to those skilled in the art that changes and modifications may be made, and therefore, the aim in the appended claims is to cover all such changes and modifications.

What is claimed is:

1. An electronic cigarette, comprising a main body and a microwave heating module disposed in the main body; wherein:

the microwave heating module comprises a shielding sleeve, a first shielding net, a second shielding net, a strip of cotton, a silicone sleeve, and a microwave source;

the strip of cotton is disposed in the shielding sleeve;

the shielding sleeve is disposed on the microwave source;

the silicone sleeve comprises a hollow cylindrical part, and the microwave source is disposed and fixed in the cylindrical part;

in a power-on state, the microwave source emits microwave, and the microwave is released into the shielding sleeve to heat and atomize e-liquid adsorbed on the strip of cotton;

the first shielding net and the second shielding net are disposed on two ends of the strip of cotton in the shielding sleeve; two openings of the shielding sleeve are enclosed by the first shielding net and the second shielding net, respectively; and the first shielding net and the second shielding net are adapted to confine the microwave emitted by the microwave source within the shielding sleeve; and the first shielding net is in a mesh configuration and has a plurality of mesh holes, and the first shielding net is adapted to convey a flow of air and vapor through the mesh holes.

2. The electronic cigarette of claim 1, wherein the shielding sleeve comprises an e-liquid inlet.

3. The electronic cigarette of claim 1, wherein the microwave heating module comprises a control panel and a battery; the battery is soldered on an input end of the control panel; an output end of the control panel is soldered to an input end of the microwave source for inputting alternating current to the microwave source to generate microwave.

4. The electronic cigarette of claim 3, wherein the microwave heating module further comprises a cylinder; the silicone sleeve and the microwave source are disposed on an upper part of the cylinder; the control panel is fixed on a lower part of the cylinder; and the shielding sleeve is in threaded connection to the cylinder.

5. The electronic cigarette of claim 4, wherein the main body comprises a housing; the microwave heating module is disposed on the housing; the battery and the lower part of the cylinder are disposed in the housing, and the upper part of the cylinder is exposed out of the housing.

6. The electronic cigarette of claim 3, wherein the main body further comprises a button disposed on the control panel and exposed out of a side wall of the housing; and the button is configured to switch on the battery.

7. The electronic cigarette of claim 4, further comprising a mouthpiece and a glass tube, wherein a bottom opening of the glass tube is disposed around a top part of the cylinder for e-liquid storage; the shielding sleeve is disposed in the glass tube; the mouthpiece is disposed in a top opening of the glass tube for sealing the top opening; the cylinder comprises at least one air vent; when in use, air enters the shielding sleeve via the at least one air vent of the cylinder and drives vapor resulting from the atomization of the e-liquid on the strip of cotton by the microwave to flow from the first shielding net to the mouthpiece for user's inhaling.

* * * * *